United States Patent
Hillner et al.

(10) Patent No.: US 7,757,018 B2
(45) Date of Patent: Jul. 13, 2010

(54) SEQUENCING CONTROL OF SIMULTANEOUSLY EXECUTED FORBIDDEN PAIRS OF FIRST AND SECOND FUNCTIONS ON AT LEAST TWO INTERACTING DEVICES BASED ON PRIORITY

(75) Inventors: Hans Hillner, Ludwigsburg (DE); Klaus Herz, Flein (DE); Lu Chen, Bietigheim-Bissingen (DE); Michael Ebert, Grossbottwar-Winzerhausen (DE); Timo Koenig, Bietigheim (DE)

(73) Assignee: Robert Bosch GmbH, Stuttgart (DE)

( * ) Notice: Subject to any disclaimer, the term of this patent is extended or adjusted under 35 U.S.C. 154(b) by 276 days.

(21) Appl. No.: 11/986,542

(22) Filed: Nov. 20, 2007

(65) Prior Publication Data
US 2009/0106457 A1  Apr. 23, 2009

Related U.S. Application Data

(63) Continuation of application No. 10/592,220, filed as application No. PCT/EP2005/051389 on Mar. 24, 2005, now abandoned.

(30) Foreign Application Priority Data
Mar. 31, 2004  (DE) ........................ 10 2004 016 473

(51) Int. Cl.
*G06F 17/00* (2006.01)
*G06F 3/00* (2006.01)

(52) U.S. Cl. .............................. 710/36; 710/1; 710/38; 710/18; 710/20; 710/40; 718/1; 718/102; 718/103; 701/1; 701/48

(58) Field of Classification Search ............ 710/1, 710/36, 38, 18, 20, 40; 718/102, 103, 1; 701/48, 1
See application file for complete search history.

(56) References Cited

U.S. PATENT DOCUMENTS

| | | | | |
|---|---|---|---|---|
| 4,642,756 A | * | 2/1987 | Sherrod | 718/103 |
| 4,780,821 A | * | 10/1988 | Crossley | 718/100 |
| 5,991,669 A | * | 11/1999 | Dominke et al. | 701/1 |
| 6,014,591 A | * | 1/2000 | Ikeda | 700/1 |
| 6,301,602 B1 | * | 10/2001 | Ueki | 718/103 |
| 7,257,813 B1 | * | 8/2007 | Mayer et al. | 718/102 |
| 2002/0123828 A1 | | 9/2002 | Bellmann et al. | |
| 2003/0171865 A1 | | 9/2003 | Moser et al. | |

FOREIGN PATENT DOCUMENTS

| | | |
|---|---|---|
| DE | 19731116 | 1/1999 |
| DE | 19744230 | 4/1999 |
| DE | 10025493 | 12/2001 |
| JP | 10-283015 | 10/1998 |
| JP | 11-191002 | 7/1999 |

* cited by examiner

*Primary Examiner*—Tammara Peyton
(74) *Attorney, Agent, or Firm*—Kenyon & Kenyon LLP

(57) ABSTRACT

A method for controlling the sequence of a plurality of functions which are executable on at least two interacting devices is provided, first of the functions being implemented on a first device and the second of the functions being implemented on a second device. A system for implementing the method is provided, including an administrative unit which controls a sequence of the functions in such a manner that it prevents a first function and a second function which interfere with one another from simultaneously running.

21 Claims, 4 Drawing Sheets

SEQUENCING CONTROL OF SIMULTANEOUSLY EXECUTED FORBIDDEN PAIRS OF FIRST AND SECOND FUNCTIONS ON AT LEAST TWO INTERACTING DEVICES BASED ON PRIORITY

CROSS-REFERENCE TO RELATED APPLICATIONS

The present application is a continuation of U.S. patent application Ser. No. 10/592,220 filed on Sep. 8, 2006 now abandoned, which in turn was a national-phase application based on international application PCT/EP05/051389 filed on Mar. 24, 2005, and claimed priority to German Application DE 102004016473.8 filed on Mar. 31, 2004, all of which are incorporated by reference herein in their entirety.

FIELD OF THE INVENTION

The present invention relates to a method and a system for controlling the sequence of a plurality of functions, which are implementable on at least two interacting devices, first group of the functions being implemented on a first of the devices, and second group of the functions being implemented on a second of the devices, which functions may be, e.g., so-called diagnostic functions for checking operating modes or components of equipment controlled by the devices.

BACKGROUND INFORMATION

An internal combustion engine in a modern motor vehicle is mentioned as an example of equipment controlled by at least two such devices. The engine may include different components, such as injection valves, throttle valves, actuators, or different sensors, such as temperature sensors, speed sensors, or an oxygen sensor. In such internal combustion engines, the devices also known as control units are used, for example, to control fuel supply, an ignition firing point, and other operating parameters of the engine. The control units are usually constructed around a microprocessor or microcontroller. Up to several hundred diagnostic functions may be implemented on the control units. These diagnostic functions check many different operating modes and components of the internal combustion engine during its operation. They make use of values of engine operating parameters, such as the temperature or the engine speed, which are supplied by the sensors installed in the engine. Some of the diagnostic functions proceed passively and simply read the values supplied by the sensors, while other diagnostic functions actively intervene in the engine operation, in order to extract the values supplied by the sensors. If an error is detected in an operating mode or a component of the engine by one of the diagnostic functions, then an information item regarding this error is stored in an error protocol in the form of an electronic data file, which may then be fetched out later by a scan tool. A warning signal may also be triggered on the instrument panel of the motor vehicle as a function of the relevance of the error.

Diagnostic functions implemented by different control units are not necessarily compatible with each other. For example, diagnostic functions intervening in the engine operation, for measuring specific operating parameters of the engine or one of its components in a particular state, may set other operating parameters of the internal combustion engine to predefined values for the time of the measurement. If a further diagnostic function, which accesses values of the operating parameters set by the diagnostic function actively intervening in the engine operation, runs concurrently to such an active diagnostic function, then this further diagnostic function arrives at an incorrect result. Therefore, it is necessary to prevent simultaneous execution of diagnostic functions, of which at least one interferes with the other.

For this purpose, in the case of known internal combustion engines having two control units, it is known, for example, that a time sequence can be set for the diagnostic functions implemented on the two control units, so that two diagnostic functions, of which at least one interferes with the other, do not run at one time. This execution sequence is transferred into a program code and fixedly stipulated to the control units. It is thereby no longer changeable during operation of the internal combustion engine.

Several considerable disadvantages result from this design approach. One of these disadvantages is the inadequate flexibility of such a system. If, for example, a new pair of diagnostic functions is later detected, of which at least one interferes with the other, then it is necessary to appropriately change the execution sequence of the diagnostic functions. In return, however, the program code must necessarily be changed at a high expense.

An additional, large disadvantage results from the fact that the fixed execution sequence of each diagnostic function stipulates a limited time window for its execution. Since suitable values of some operating parameters of the engine, such as a specific load or relative air mass flow rate, speed, or temperature, are often necessary for the execution of a diagnostic function, the situation often occurs in which these necessary values are just not present during the limited time window, which the diagnostic function is given for running. Therefore, the respective diagnostic function is not ready to be executed during the time window assigned to it. Therefore, the diagnostic function does not run, and the time window elapses without being utilized. Only within a later time window assigned to it does the diagnostic function have the opportunity to run again, it being, in turn, questionable if the operating-parameter values necessary for this will be present within this next time window.

SUMMARY

The present invention provides a method for controlling the sequence of a plurality of functions that are implemented on at least two interacting devices, as well as a system for implementing this method, by which the above-mentioned disadvantages are eliminated.

According to the method of the present invention, the functions are no longer bound to a temporally fixed execution sequence. However, in a step (a) of the method, forbidden pairs made up of a first group function and a second group function are defined, of which at least one interferes with the other upon simultaneous execution. This is followed by steps (b), in which each first group function is assigned a priority value; (c), where functions having the highest priority value are selected among the first group functions, in which case, when a second group function is executed, the first group functions that form a forbidden pair with the running, second group function are disregarded; as well as (d), in which a remaining, selected first group function is identified that is finally started in step (e). The result is that the order in which the functions are executed is a function of the priority value assigned to the functions. This may be constantly recalculated during operation of the devices. For example, a time span elapsed since the last execution of a function may be taken into account by the priority value, so that the longer it has been since a function has been executed, the higher the priority value that is assigned to it. If the devices control equipment, the execution sequence of the functions is adapted in this manner to different operating states, and improved time coverage of operating cycles of the equipment by functions is ensured. A further advantage of the present invention is the option of being able to make modifications inexpensively. For example, if it is determined after start-up of the devices, at a later time, that when a first function and a second function run simultaneously, one of the two does interfere with the other in a manner contrary to expectations, then these two functions may easily be defined as an additional forbidden pair. Neither must a new, complicated execution sequence be generated for all of the functions, nor is the time-consuming generation of a new program code necessary. Previously known devices having administrative units may be reverted to for the equipment-specific execution of the method according to the present invention. For example, it is possible to revert to known devices, as are in use for controlling equipment with the aid of only one device having functions implemented in it.

In one example embodiment of the present invention, steps (b), (c), and (d) are executed by an administrative unit common to all of the devices. Therefore, this administrative unit is in charge of all of the devices with regard to steps (b) through (d). To start the identified function, the administrative unit then issues a starting command for this function to the device in which the identified function is implemented.

In a further example embodiment of the present invention, a first administrative unit belonging to the first device executes steps (b), (c), and (d), while an administrative unit of the second device executes corresponding steps (b'), (c'), and (d') regarding the second functions, and a second function identified in step (d') starts in a step (e'). In this variant, both the first administrative unit and the second administrative unit are integrated into the sequencing control for the functions, each of the administrative units being in charge of the functions of its respective device.

When the two administrative unit simultaneously execute respective steps (b), (c), and (d) and (b'), (c'), and (d'), it may occur that in simultaneously executed steps (d) and (d'), the two devices each identify the very functions that form a forbidden pair. In order to prevent problems resulting from this, it may be provided that in each instance, only the first of the two identified functions is started, while the identified second function is denied a starting command. When the second administrative unit, whose function was not started, then repeats step (d'), it may take into account the now-running function of the first device.

Instead of generally barring the identified second function from starting in the event of simultaneity, it may also be checked beforehand, if the functions simultaneously identified by the two administrative units form a forbidden pair, and the second function is only rejected when this is the case.

It may be provided that at least functions, which are started by each of the administrative units and form a forbidden pair with at least one function of the other respective administrative unit, as well as the termination of these functions, are reported by each of the administrative units to the other respective unit. Since each administrative unit is informed of the start and the termination of functions of other administrative units, then during the selection of the functions in step (c) or (c'), each administrative unit may at any time disregard the ones that form a forbidden pair with currently running functions, without having to make further queries. In this context, it is possible to inform the other respective administrative units of, on one hand, every start and every termination of each function or, on the other hand, of only the start and termination of functions that form forbidden pairs with other functions.

In place of signaling the execution of the start and termination of functions, each of the administrative units may signal each intended start of a function to the other respective administrative unit, or else only an intended start of functions, which have been defined in step (a) as a forbidden pair with at least one function of the other respective administrative unit. An administrative unit receiving this status signal may then transmit a response to the signaling administrative unit as to whether the function identified and intended to be started by the latter forms a forbidden pair with a function already started by the receiving administrative unit. If this is so, then the signaling administrative unit dispenses with the intended start of the function.

In this context, one of the administrative units may be set up to be a central administrative unit, at which all of the other administrative units inquire, prior to an intended start of one of their respective functions, if the function forms a forbidden pair with a function that is already running.

Equipment may be controlled by the two devices, the first and second functions interacting with the equipment. During the assignment of the priority value for each first function and each second function, it may then be advantageously assessed, on the basis of values of particular operating parameters of the equipment, whether or not the first or second function is executable. In this embodiment, the selection of functions having the highest priority value, in step (c), only takes place among functions judged to be executable. The case in which a function is selected on the basis of a high priority value, but cannot be started because the values of specific parameters of the equipment necessary for its execution are not present, is therefore eliminated.

Among the first and second functions, there may be at least one that tests at least one operating mode or at least one component of the equipment controlled by the devices. Such a function is generally called a diagnostic function.

A characteristic of an operating mode or component of the equipment, detected by such a diagnostic function, e.g., an error of the operating mode or component, is likewise advantageously used for assigning a priority value to another function. This allows characteristics already diagnosed, such as errors of functions or components of the equipment, to be taken into account during the selection of the functions. Functions, which are not executable or would lead to wrong results upon execution, due to, perhaps, such an error or particular characteristics of operating modes or components of the equipment, may be excluded from the selection by this means. Operating modes or components of the equipment, whose characteristics are to be used for assigning a priority value to a function, may also be already defined by the manufacturer in the same manner as the forbidden pairs.

In order that these characteristics can be considered while assigning the priority values, the specific administrative unit undertaking this assignment must inform one of the devices about the characteristics detected by diagnostic functions implemented in the other respective device. In this context, a bus, which connects the two devices, and via which such information is transmitted, is in danger of being overloaded by the volume of information. Therefore, in order to keep the data transmission between the devices as low as possible, at least one of the administrative units preferably only reports, to the other respective administration unit, characteristics of operating modes or components of the equipment, which are detected by diagnostic functions and are to be used for assigning a priority value to a function.

If an error that can have several causes is detected during the implementation of a diagnostic function, then at least one further diagnostic function may be executed in order to verify the presence of at least one of the causes. For example, when the diagnostic function for this test accesses measured values of a sensor, the cause of an error of an operating mode or component of the equipment, detected by a diagnostic function, may be that either this operating mode or component of the equipment is actually defective, or that the sensor is damaged. Therefore, in order to validate the allegedly detected error in the operating mode or component of the equipment, a further diagnostic function may be started that checks the sensor for freedom from defects. If this further diagnostic function determines that the sensor is not damaged and is functioning correctly, then the error in the operating mode or component of the equipment, allegedly detected by the diagnostic function, is confirmed. In this manner, more reliable information regarding the presence of errors in operating modes or components of the equipment is obtained. In order that this further diagnostic function is executed as soon as possible, its priority value is advantageously set high.

If a function has been executed, its priority value may be set back in order to prevent the function from being executed too frequently.

The first device and the second device may each be constructed around microcontrollers, the administrative unit being implemented on one of the two microcontrollers while using a part of its processing resources. In addition, the two microcontrollers may also be identical. This may then be the case, for example, when a separate administrative unit is provided for the two devices.

Furthermore, the system may include an intermediate buffer, in which status messages regarding the starting or termination of a function or an intent to start a function may be temporarily stored. Administrative units having to decide on starting a function may then access this intermediate buffer and authorize the start of the respective function or refuse it on the basis of the information stored in the intermediate buffer.

The system may include equipment controlled by the devices. This equipment may be an engine, e.g., an internal combustion engine of a motor vehicle.

The system may include a CAN bus. Such a bus is already installed in many motor vehicles and may therefore be advantageously used for the method and system of the present invention, without additional costs.

DETAILED DESCRIPTION

Figure 1:
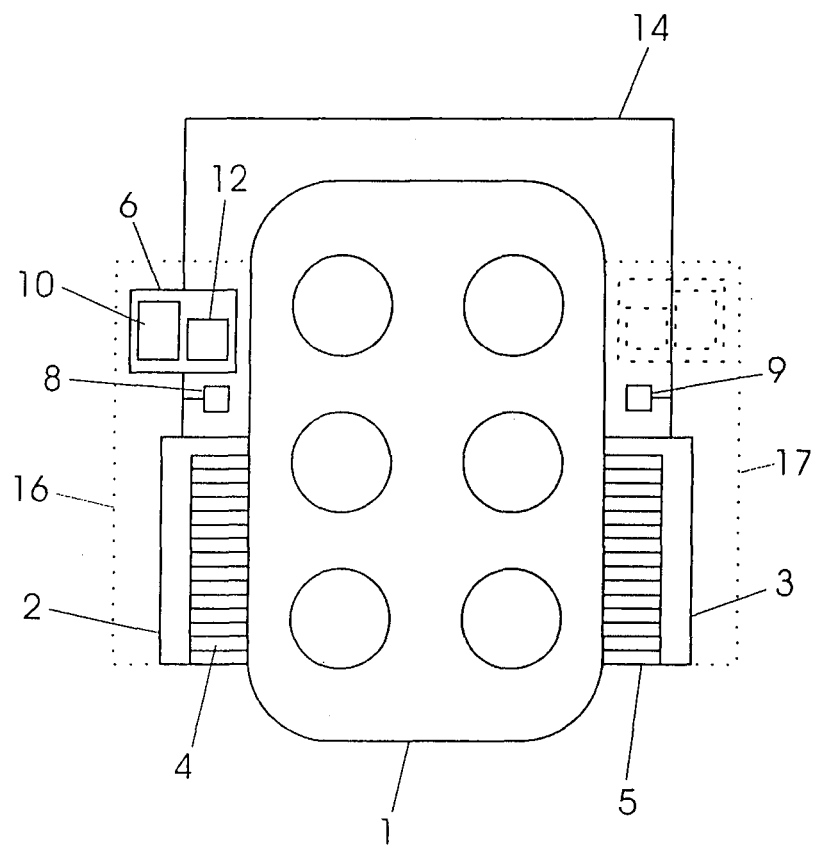
FIG. 1 shows a schematic representation of a first system according to the present invention.

The system schematically represented in FIG. 1 includes an internal combustion engine 1, which is controlled by two control units 2, 3. Several diagnostic functions 4 are implemented in control unit 2, and several diagnostic functions 5 are implemented in control unit 3. An administrative unit 6 is connected to the two control units 2, 3 via a CAN bus 14. Administrative unit 6 has a computational module 10 and a validator 12. Each control unit 2, 3 is assigned an error buffer 8, 9, to which respective control unit 2, 3 and administrative unit 6 have access.

The operation of internal combustion engine 1 is controlled partly by control unit 2 and partly by control unit 3. In this context, different processes and functions run on internal combustion engine 1 and its components. These functions may relate to internal combustion engine 1 as a whole or also only to parts or components of internal combustion engine 1. In order to ensure error-free functioning of internal combustion engine 1, these functions must be permanently controlled and monitored. Diagnostic functions 4, 5 are in charge of this task. Among diagnostic functions 4, 5, there are some that are only executable at specific values of various operating parameters of internal combustion engine 1, such as a specific temperature or engine speed. In addition, among the diagnostic functions 4 implemented in control unit 2 are certain diagnostic functions 4, which interfere with some of the diagnostic functions 5 implemented in control unit 3 when run simultaneously, which means that the latter supply a false result. Therefore, it is necessary to prevent two such diagnostic functions 4, 5 from running simultaneously.

Figure 2:
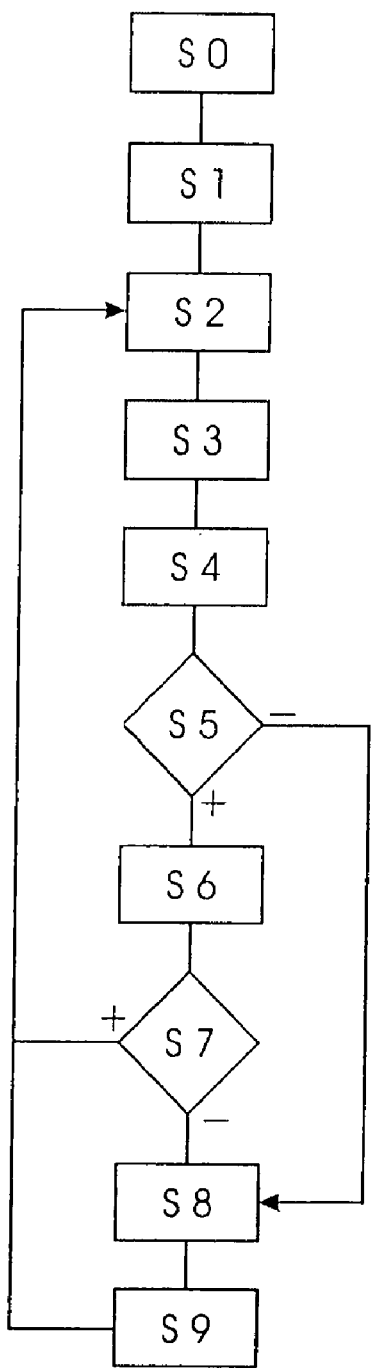
FIG. 2 is a flow chart for controlling diagnostic functions for the system of FIG. 1.

A method for controlling the sequence of diagnostic functions 4, 5 is shown in the flow chart of FIG. 2. In this context, step S0 marks the start of the method. In subsequent step S1, all critical pairs of diagnostic functions 4, 5, of which at least one has a disruptive effect on the other when simultaneously executed, are ascertained and defined as forbidden pairs within an exclusion matrix, which is stored in computational module 10.

In step S2, computational module 10 calculates a priority value for each diagnostic function 4, 5 and assigns it to respective diagnostic function 4, 5. When a priority value of a diagnostic function 4, 5 is calculated, e.g., inter alia, a period of time elapsed since the last execution of corresponding diagnostic function 4, 5 may be taken into account. In this context, e.g. the longer ago a diagnostic function 4, 5 has last been executed, the higher the priority value that may be assigned to this diagnostic function 4, 5.

After the priority values have been assigned, administrative unit 6 selects one of control units 2, 3 in step S3. For example, administrative unit 6 may select the control unit 2, 3 presently having the most unutilized storage capacity for processing. To simplify the description, it is assumed that, without limiting the universality, administrative unit 6 selects control unit 2 in step S3.

From diagnostic functions 4 implemented in control unit 2, computational module 10 selects, in subsequent step S4, the ones that have the highest priority value of all diagnostic functions 4 and are simultaneously executable at the current values of the operating parameters of internal combustion engine 1.

What follows in step S5 is a decision as to whether a diagnostic function 5 of control unit 3 is currently being executed. If this is not the case, then the method continues with step S8 described further below. If a diagnostic function 5 is currently running, then in step S6, computational module 10 forms pairs with every single one of executable diagnostic functions 4 selected in step S4 and currently running diagnostic function 5, compares these in subsequent step S7 to the forbidden pairs recorded in the exclusion matrix, and selects, from diagnostic functions 4 selected in step S4, each one that forms such a forbidden pair with currently implemented diagnostic function 5. When all executable diagnostic functions 4 selected in step S4 are selected in the process, the method returns from step S7 to step S2. If at least one of the diagnostic functions 4 selected in step S4 remains that does not form a forbidden pair with any of currently running diagnostic functions 5, then the method continues with step S8, where in each instance, a diagnostic function 4 from the remaining diagnostic functions 4 is identified by computational module 10. In the previously mentioned case, in which no currently running diagnostic function 5 is detected in step S5 and the method continues with step S8, one of diagnostic functions 4 selected in step S3 is identified in step S8. Finally, specific diagnostic function 4 identified in step S8 is started in step S9. The method continues by repeating the steps from step S2 on. In the case in which control unit 3 is selected in step S3, the diagnostic functions 5 having the highest priority value are selected in step S4, and the method is executed as just described, using selected diagnostic functions 5 instead of selected diagnostic functions 4.

In this context, each running diagnostic function 4, 5 started in this manner tests a different function running on internal combustion engine 1 or a component of internal combustion engine 1. If one of diagnostic functions 4, 5 detects an error in the function or component tested by it, it records this error in error buffer 8, 9, which is assigned to control unit 2, 3 in which it is implemented. One of diagnostic function 4, 5, which has detected an error, is designated in the following by 4' or 5'. If necessary, the entries in error buffer 9 may be transferred via CAN bus 14 to error buffer 8 without, however, being erased in error buffer 9 in the process. This may be necessary, because the functions running on internal combustion engine 1 include, inter alia, ones that can only access one of error buffers 8, 9, but are possibly dependent on error entries contained in other error buffer 8, 9.

The error entries of error buffers 8, 9 are also taken into account in the calculation of the priority values for diagnostic functions 4, 5 in step S2. For if an error entry relates to a faulty component of internal combustion engine 1, which is required by one of diagnostic functions 4, 5, then this diagnostic function 4, 5 in question can no longer supply a correct result due to the faulty component. In such a case, this diagnostic function 4, 5 is assigned such a low priority value in step S2, that the execution of diagnostic function 4, 5 is thereby blocked. A predefined blocking matrix, which specifies diagnostic functions 4, 5 to be blocked for each error entry, may be used for taking into account the error entries when the priority values are set.

There may be different reasons for an error discovered by a diagnostic function 4', 5'. For example, an error of the tested function or component of internal combustion engine 1 may actually be present; however, an error message by a diagnostic function 4', 5' may also be produced by the fact that equipment utilized by diagnostic function 4', 5' in question, such as a measuring probe, is damaged and supplies incorrect measured values to diagnostic function 4', 5'. Validator 12 is provided for this reason. Stored in validator 12 is a table, which indicates, for each diagnostic function 4, 5, the components or functions of internal combustion engine 1 used by it. If an error allegedly discovered by a diagnostic function 4', 5' is recorded in error buffer 8, validator 12 determines the components or functions used by this diagnostic function 4', 5' with the aid of the table and demands at computational module 10 that diagnostic functions 4", 5" be executed for testing these components or functions. This is taken into account by computational module 10 in step S2 during the calculation of the priority values, in that it sets the priority values of required diagnostic functions 4", 5" high so that they are executed right away. If these diagnostic functions 4", 5" detect correct functioning of the components checked by them, the error is marked by validator 12 in error buffer 8 as having been tested. If one of diagnostic functions 4", 5" detects a faulty component or function, then this is regarded as the cause of the error detected by diagnostic function 4' or 5', the entry for diagnostic function 4', 5' is designated as a sequence error, and the corresponding cause of the error is entered. Thus, a technician may rapidly detect and eliminate the cause of a fault on the basis of the content of error buffers 8 and 9.

As a modification of the system shown in FIG. 1, it is possible to form administrative unit 6, control unit 2, and error buffer 8, using a single microcontroller 16 that is sketched in FIG. 1 in the form of a dotted outline.

According to a further modification, control unit 3 is also formed by a microcontroller 17. This is structurally identical to microcontroller 16, i.e. it has an administrative unit containing a computational module and a validator, as does the latter microcontroller. Since this administrative unit is not needed for the described operation of the system, it is deactivated and therefore represented by dotted lines. In this manner, the system shown in FIG. 1 may be implemented by two known microcontrollers having a control unit, administrative unit, and error buffer, as are each individually used in known internal combustion engines for controlling the engine.

Figure 3:
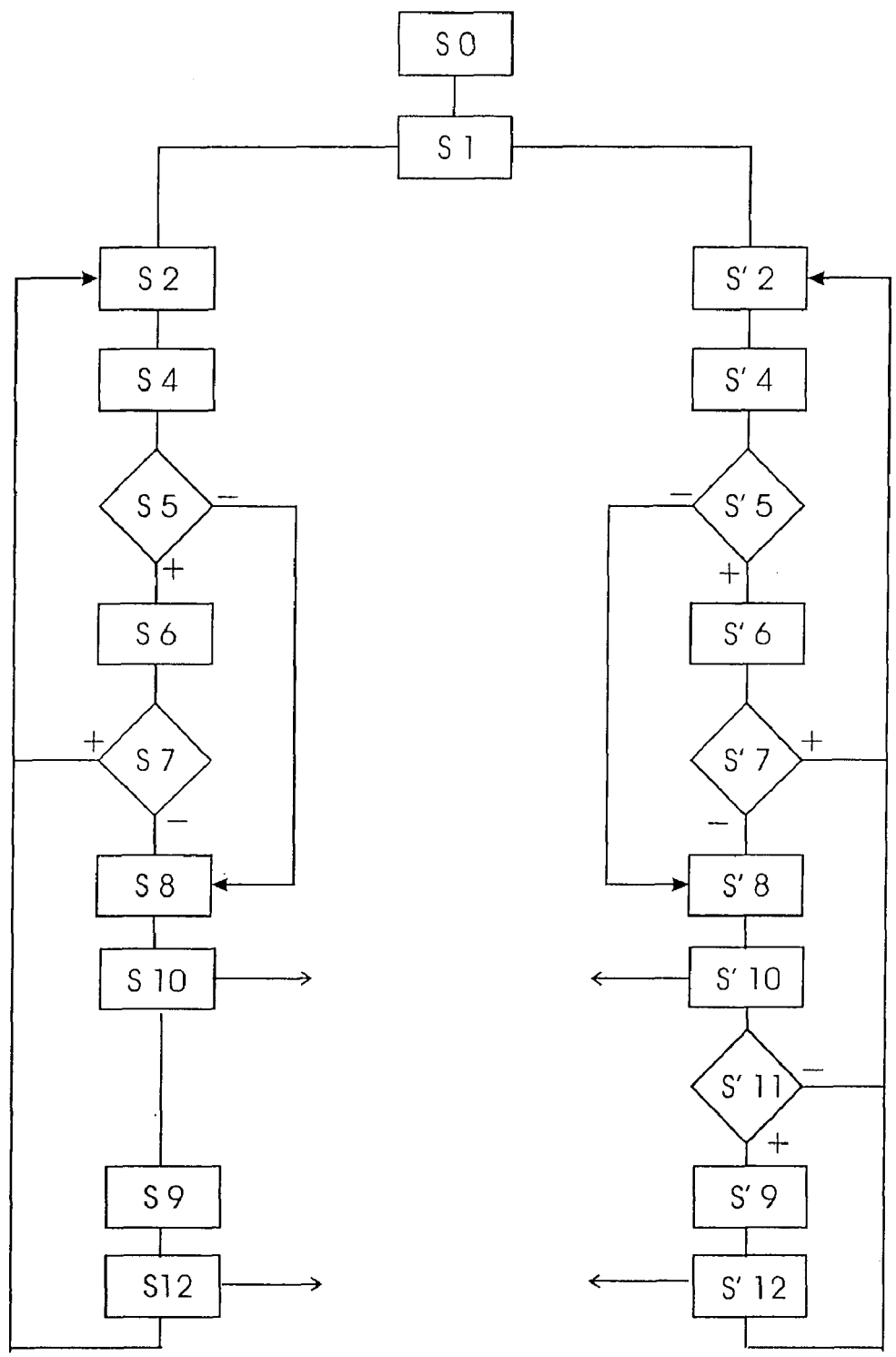
FIG. 3 is a second flow chart for controlling diagnostic functions for a modified system.

FIG. 3 shows a flowchart of a sequencing control method, which may be used in a system having two identical microcontrollers 16, 17 whose administrative units 6, 7 are active. As in the flow chart of FIG. 2, step S0 designates the start of the method. In step S1, forbidden pairs are defined in a manner likewise analogous to FIG. 2. However, these are now stored as exclusion matrices in computational modules 10, 11 of the two administrative units 6, 7.

Subsequent steps S2 through S8 are executed by administrative unit 6 for diagnostic functions 4. Corresponding steps S'2 through S'8 are executed by administrative unit 7 for diagnostic functions 5. Steps S2 through S8 and S'2 through S'8 are the same method steps as described above with regard to FIG. 2. Only step S3 of the flowchart of FIG. 2 is omitted in the flowchart of FIG. 3, since none of control units 2, 3 must be selected anymore.

After diagnostic functions 4, 5 are identified in steps S8, S'8, respectively, administrative units 2, 3 report the identified diagnostic function to the other administrative unit in steps S10, S'10, respectively. Administrative unit 7 stores the received status message, regardless of the method step at which it finds itself, in order to take it into account during the next execution of step S'6. Administrative unit 6 only stores the received status message when it is not at step S10, i.e. the reception of the status message does not coincide with a self-transmitted status message. If the two status messages coincide, then in step S'11, administrative unit 7 additionally disregards the diagnostic function identified by it and returns to step S'2.

In steps S9 and S'9, the administrative units each start the diagnostic function identified by themselves.

In steps S12 and S'12, the termination of a diagnostic function is reported, in each instance, to the other administrative unit.

Figure 4:
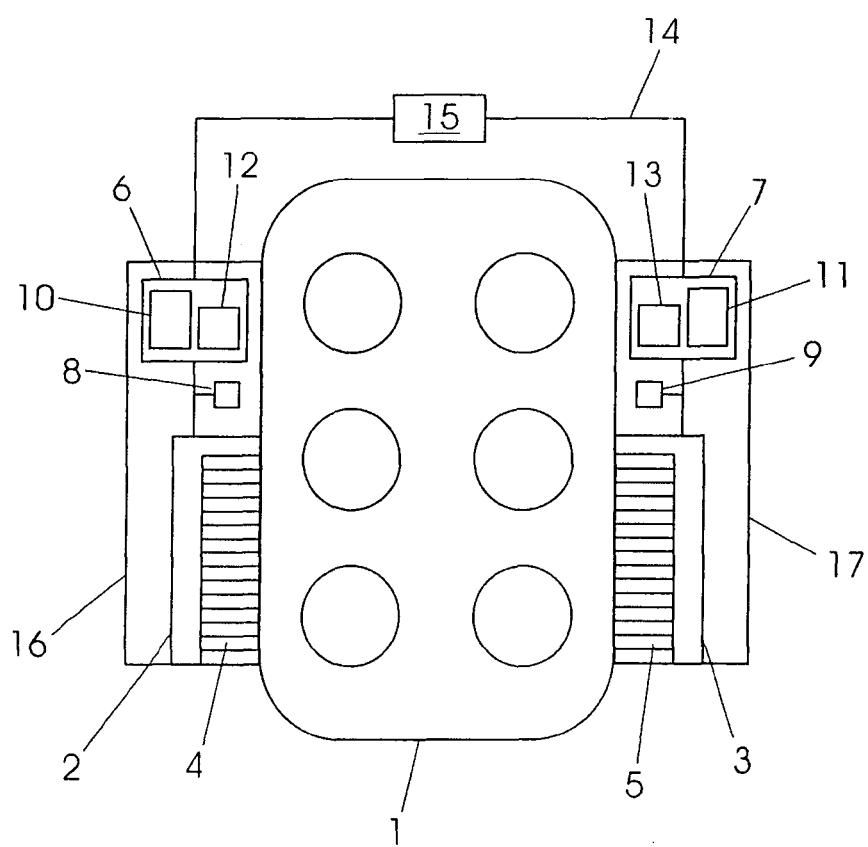
FIG. 4 shows a schematic representation of a second system according to the present invention.

A further refinement of the system, having two identical microcontrollers 16 and 17, is shown in FIG. 4. A control unit 2 and an administrative unit 6, as well as an error buffer 8, are provided in microcontroller 16 in the form described in FIG. 1. Microcontroller 17 correspondingly includes a control unit 3 having diagnostic functions 5, an administrative unit 7 including a computational module 11 and validator 13, and an error buffer 9. An intermediate buffer 15 may be accessed by the two administrative units 6, 7 via the CAN bus.

Figure 5:
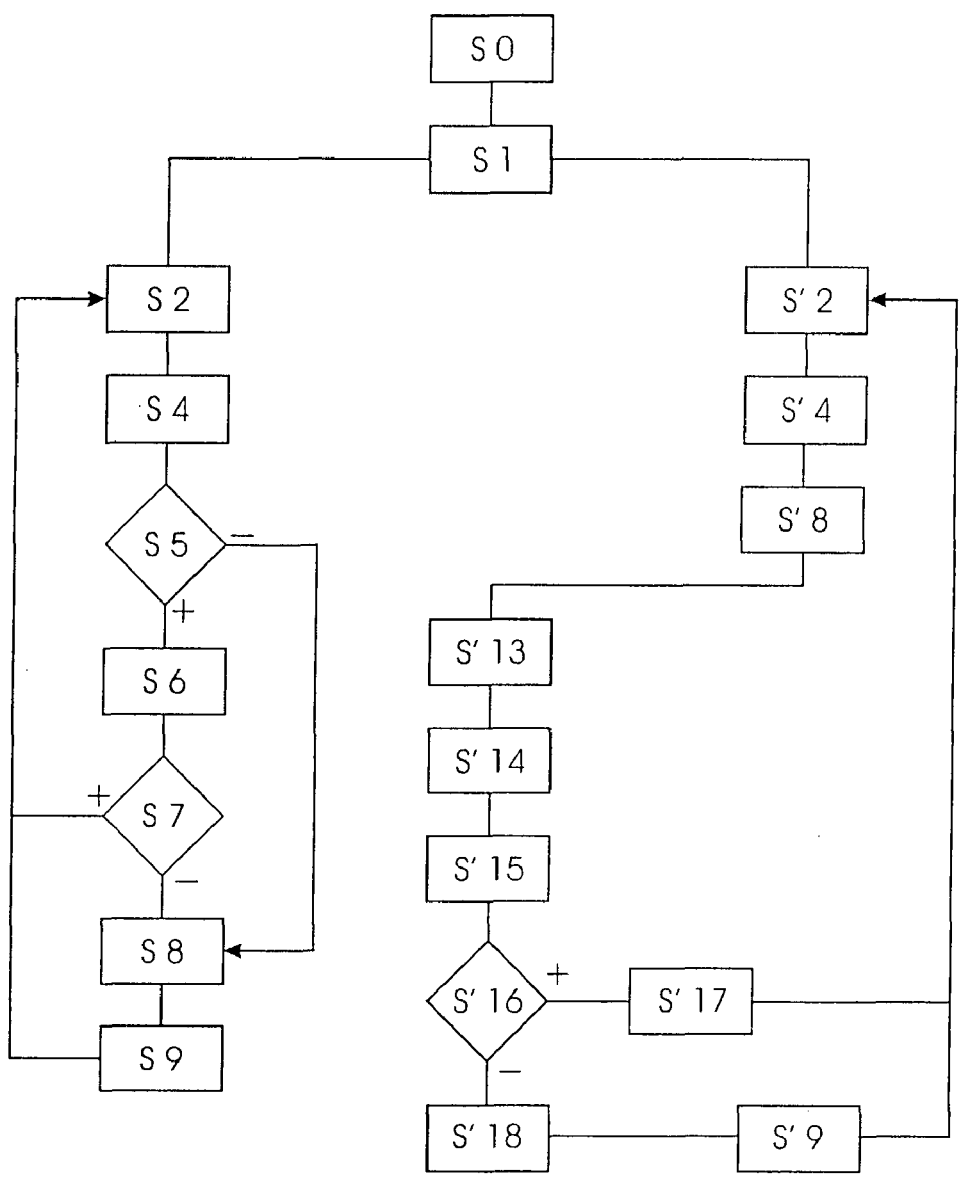
FIG. 5 is a flow chart for controlling diagnostic functions for the system of FIG. 4.

The sequencing control of diagnostic functions 4, 5 is implemented according to the method represented in FIG. 5.

Steps S0 and S1 are implemented for the two microcontrollers 16, 17 as described for FIG. 3. In the same way, steps S2 through S8 are executed in a manner analogous to the corresponding steps of FIG. 3 for microcontroller 16, that is, the execution of diagnostic functions 4 is controlled with the aid of these method steps. Steps S'2, S'4, and S'8 running on microcontroller 17 are analogous to steps S2, S4, and S8. According to this, a diagnostic function 5 selected in step S'4 is identified in directly subsequent step S'8. In subsequent step S'13, however, an information item regarding diagnostic function 5, which was identified in step S'8 and is intended to be started, is written to intermediate buffer 15. In step S'14, administrative unit 6 fetches this information item out of intermediate buffer 15, form pairs with this identified diagnostic function 5 and all currently running diagnostic functions 4 in step S'15, and checks, in step S'16, if diagnostic function 5 identified by administrative unit 7 as being meant to be started forms a forbidden pair with a diagnostic function 4 currently running. If this is the case, then in step S'17, it communicates this to administrative unit 7 via CAN bus 14 and refuses to enable identified diagnostic function 5 to start. In this case, the method continues again with step S'2. In the other case, in which diagnostic function 5 identified by administrative unit 7 as being intended to be started, does not form a forbidden pair with a diagnostic function 4 currently running, then in step S'18, administrative unit 6 enables identified diagnostic function 5 to start, whereupon it is started by administrative unit 7 in step S'9. Therefore, in the variant of the system according to the present invention, shown in FIG. 4, administrative unit 6 is intended to be of a higher level than administrative unit 7, which means that in order to start a diagnostic function 5 identified by it, it must obtain permission from administrative unit 6.

What is claimed is:

1. A method for controlling a sequence of a plurality of functions which are implemented on at least two interacting devices, a first group of functions being assigned to be implemented on a first interacting device and a second group of functions being assigned to be implemented on a second interacting device, the method comprising:
   (a) defining at least one forbidden pair of functions, wherein the forbidden pair includes a first function from the first group and a second function from the second group, and wherein at least one of the first function and the second function interferes with the other when simultaneously executed;
   (b) assigning each function of the first group of functions a priority value;
   (c) selecting, among the first group of functions, at least two functions having the highest priority values, wherein if the second function of the forbidden pair is currently being executed, the first function of the forbidden pair is eliminated from the at least two selected functions among the first group of functions;
   (d) identifying a single function from the at least two selected functions among the first group of functions; and
   (e) starting execution of the single function identified in step (d).

2. The method as recited in claim 1, wherein the steps (b), (c), and (d) are implemented by an administrative unit common to the first and the second interacting devices.

3. The method as recited in claim 1, wherein a first administrative unit of the first interacting device executes the steps (b), (c), and (d), and wherein a second administrative unit of the second interacting device performs:
   (b') assigning each function of the second group of functions a priority value;
   (c') selecting, among the second group of functions, at least two functions having the highest priority values, wherein if the first function of the forbidden pair is currently being executed, the second function of the forbidden pair is eliminated from the at least two selected functions among the second group of functions;
   (d') identifying a single function from the at least two selected functions among the second group of functions; and
   (e') starting execution of the single function identified in step (d').

4. The method as recited in claim 3, wherein if the single function in step (d) and the single function in step (d') are simultaneously identified, it is checked whether the functions identified in steps (d) and (d') form the forbidden pair, and if so, execution of only one of the functions identified in steps (d) and (d') is started.

5. The method as recited in claim 3, wherein each of the first and second administrative units reports to the other administrative unit an occurrence of:
   the single function started in one of step (e) and step (e') forming the forbidden pair with at least one function assigned to be implemented by the other respective administrative unit; and
   the termination of the single function started in one of step (e) and step (e').

6. The method as recited in claim 5, wherein each of the first and second administrative units reports to the other administrative unit an intended start of the single function in one of step (e) and step (e') which forms the forbidden pair with at least one function assigned to be implemented by the other respective administrative unit.

7. The method as recited in claim 3, wherein an equipment is controlled by the first and second interacting devices, and wherein the first group of functions and the second group of functions interact with the equipment.

8. The method as recited in claim 7, wherein in step (c), for each function of the first group, and in step (c'), for each function of the second group, it is determined on the basis of selected operating parameters of the equipment whether the function is executable, and wherein functions which have the highest priority values and are determined to be executable are selected.

9. The method as recited in claim 8, wherein at least one function of the first group and the second group is a diagnostic function, and wherein one of an operating mode and a component of the equipment is checked by execution of the diagnostic function.

10. The method as recited in claim 9, wherein a characteristic of the one of the operating mode and the component of the equipment detected by the executed diagnostic function is used for assigning a priority value to a function in one of step (b) and step (b').

11. The method as recited in claim 10, wherein at least one of the first and second administrative units only reports to the other administrative unit the characteristic of the one of the operating mode and the component of the equipment used for assigning a priority value to a function in one of step (b) and step (b').

12. The method as recited in claim 9, wherein when an error is detected during the execution of the diagnostic function, at least one additional diagnostic function is executed in order to verify a presence of at least one of a plurality of causes.

13. The method as recited in claim 12, wherein the priority value of the at least one additional diagnostic function is set high in order to immediately start the at least one additional diagnostic function.

14. The method as recited in claim 3, wherein a priority value of an executed function is lowered immediately after the execution.

15. A system for controlling a sequence of a plurality of functions implemented on at least two interacting devices, comprising:
 a first interacting device and a second interacting device, wherein a first group of functions are assigned to be implemented on the first interacting device and a second group of functions are assigned to be implemented on the second interacting device; and
 at least one administrative unit configured to:
  store an identification of at least one defined forbidden pair of functions, the forbidden pair including a first function from the first group and a second function from the second group, wherein at least one of the first functions and the second function interferes with the other when simultaneously executed;
  assign each function of the group of functions a priority value;
  select, among the first group of functions, at least two functions having the highest priority values, wherein, if the second function of the forbidden pair is currently being executed, the first function of the forbidden pair is eliminated from the at least two selected functions among the first group of functions;
  identify a single function from the at least two selected functions among the first group of functions; and
  start execution of the identified single function.

16. The system as recited in claim 15, wherein the first interacting device includes at least a portion of a first microcontroller, and wherein the second interacting device includes at least a portion of a second microcontroller, and wherein the administrative unit is implemented in one of the first and second microcontrollers.

17. The system as recited in claim 16, wherein the first microcontroller and the second microcontroller are identical.

18. The system as recited in claim 16, further comprising:
 an intermediate buffer connected to the at least one administrative unit for temporarily storing a status message generated by the at least one administrative unit.

19. The system as recited in claim 16, further comprising:
 an equipment controlled by the first and second interacting devices.

20. The system as recited in claim 19, wherein the equipment is an internal combustion engine.

21. The system as recited in claim 16, further comprising:
 a CAN bus for connecting the first and second interacting devices.

* * * * *